May 19, 1970  R. DUMPROFF ET AL  3,512,708
DEVICE FOR STORING AND DISPLAYING DATA
Filed June 26, 1968  8 Sheets-Sheet 1
FIG. 1
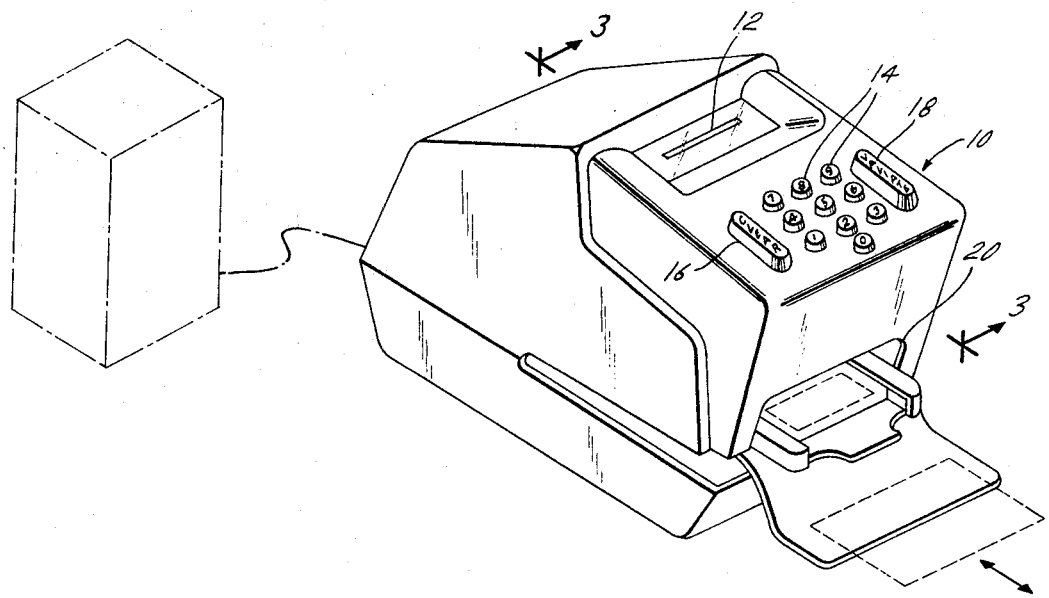
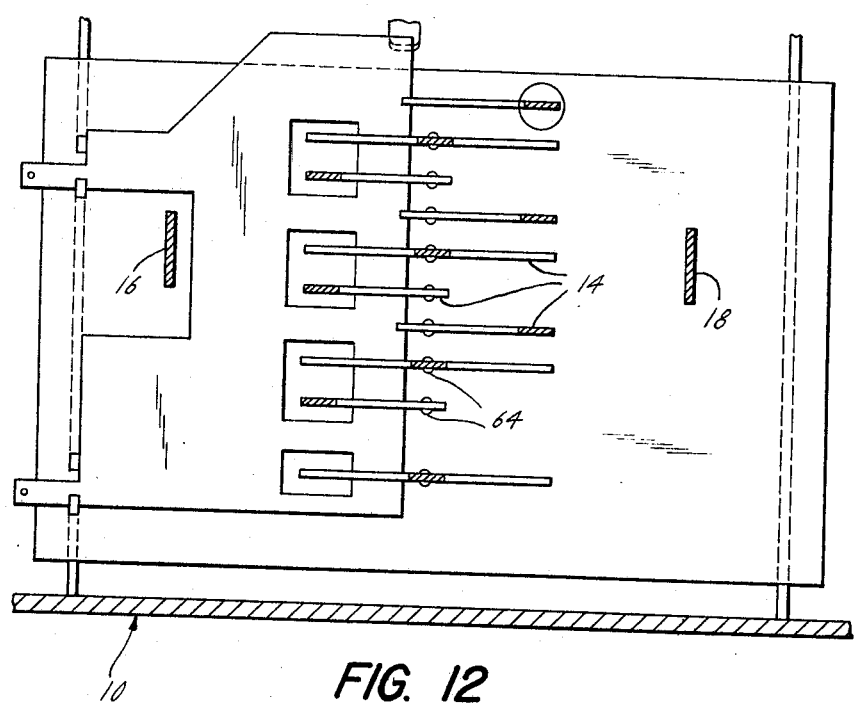
FIG. 12
INVENTORS
ROLF DUMPROFF
EUGENE I. GERTLER
DONALD E. KAPLAN
BY
ATTORNEY May 19, 1970

R. DUMPROFF ET AL 3,512,708

DEVICE FOR STORING AND DISPLAYING DATA

Filed June 26, 1968

INVENTORS
ROLF DUMPROFF
EUGENE I. GERTLER
DONALD E. KAPLAN

BY
*Theodore Jay*
ATTORNEY

May 19, 1970 R. DUMPROFF ET AL 3,512,708
DEVICE FOR STORING AND DISPLAYING DATA
Filed June 26, 1968 8 Sheets-Sheet 4

INVENTORS
ROLF DUMPROFF
EUGENE I. GERTLER
DONALD E. KAPLAN
BY
ATTORNEY

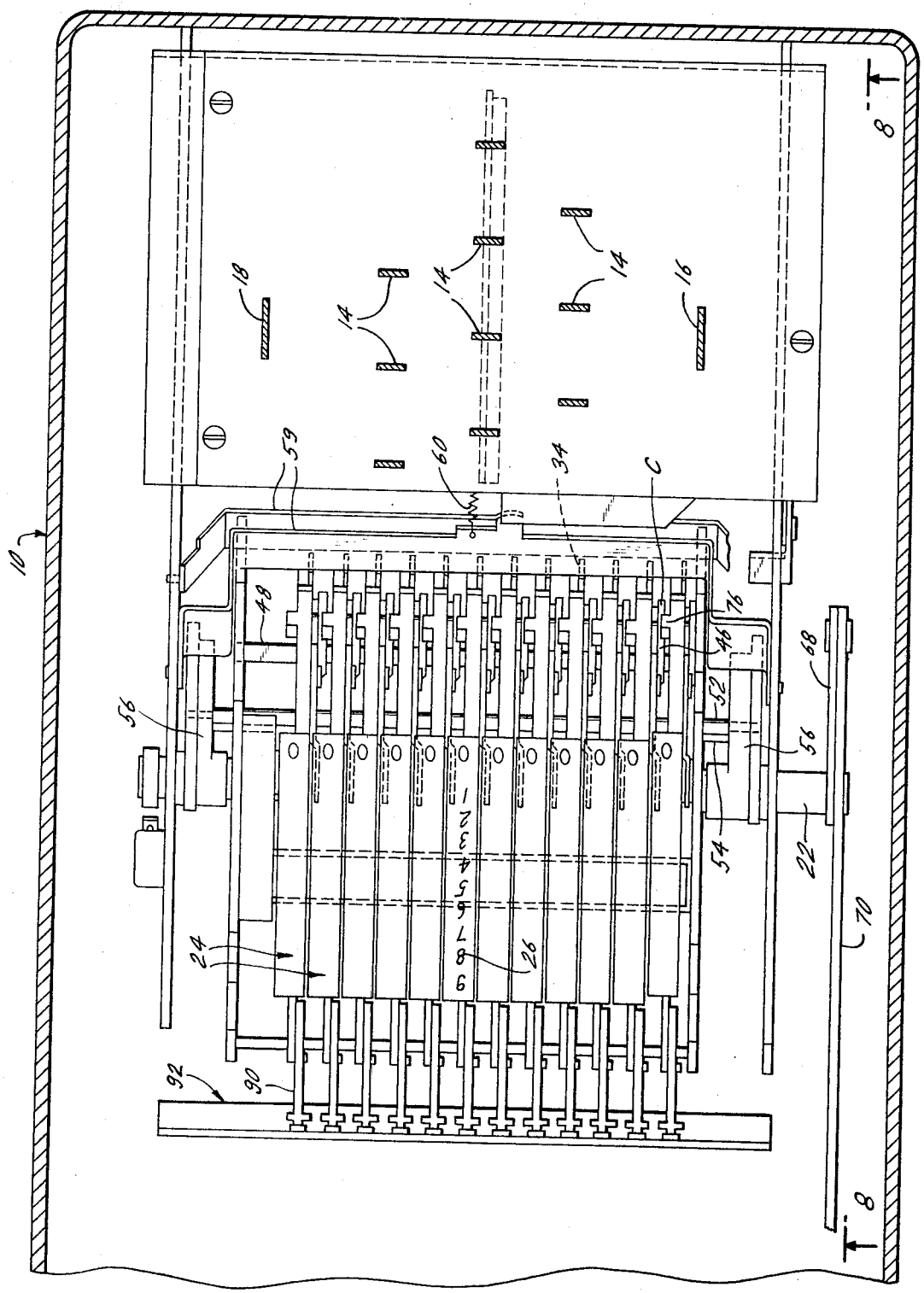

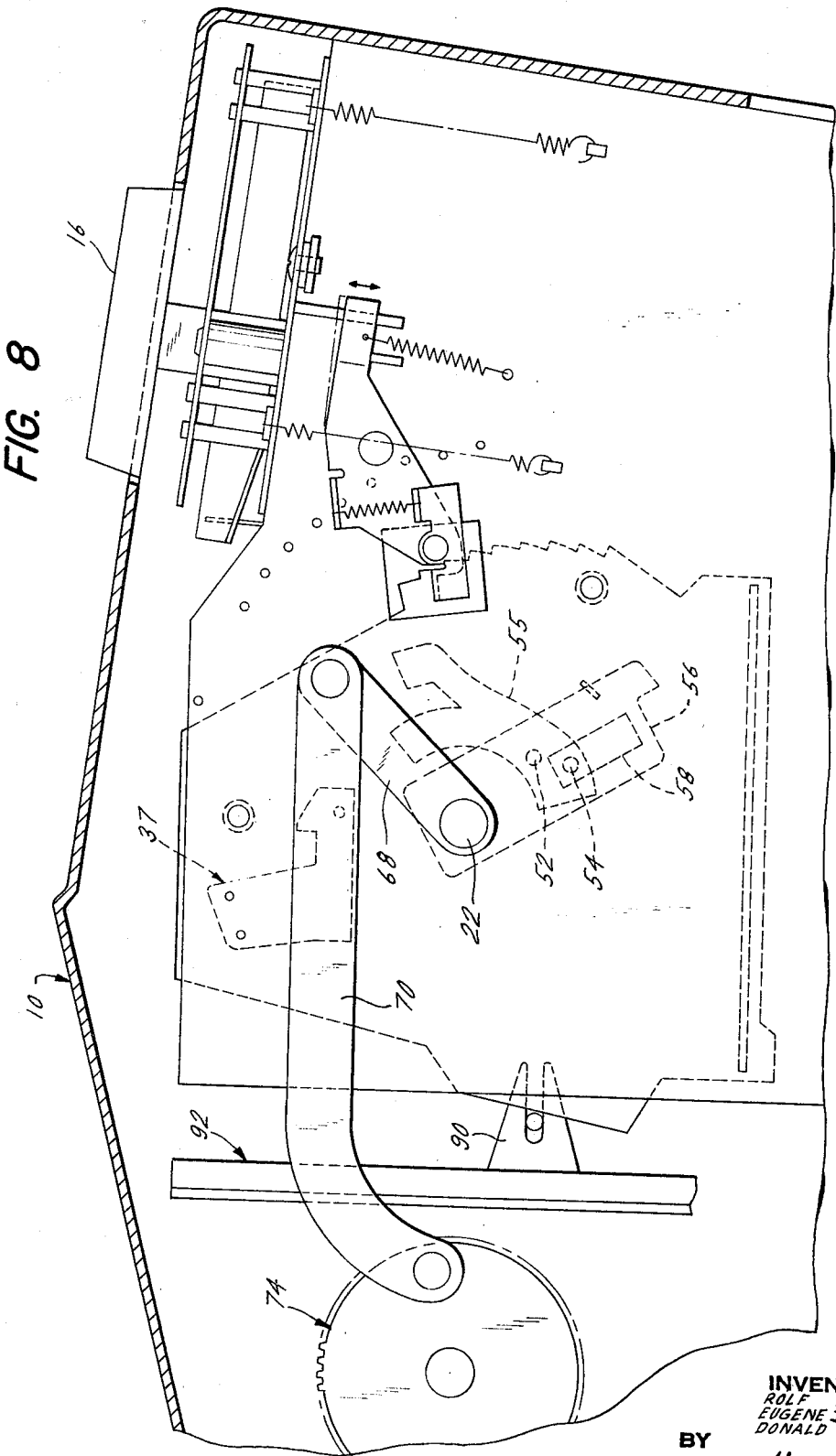

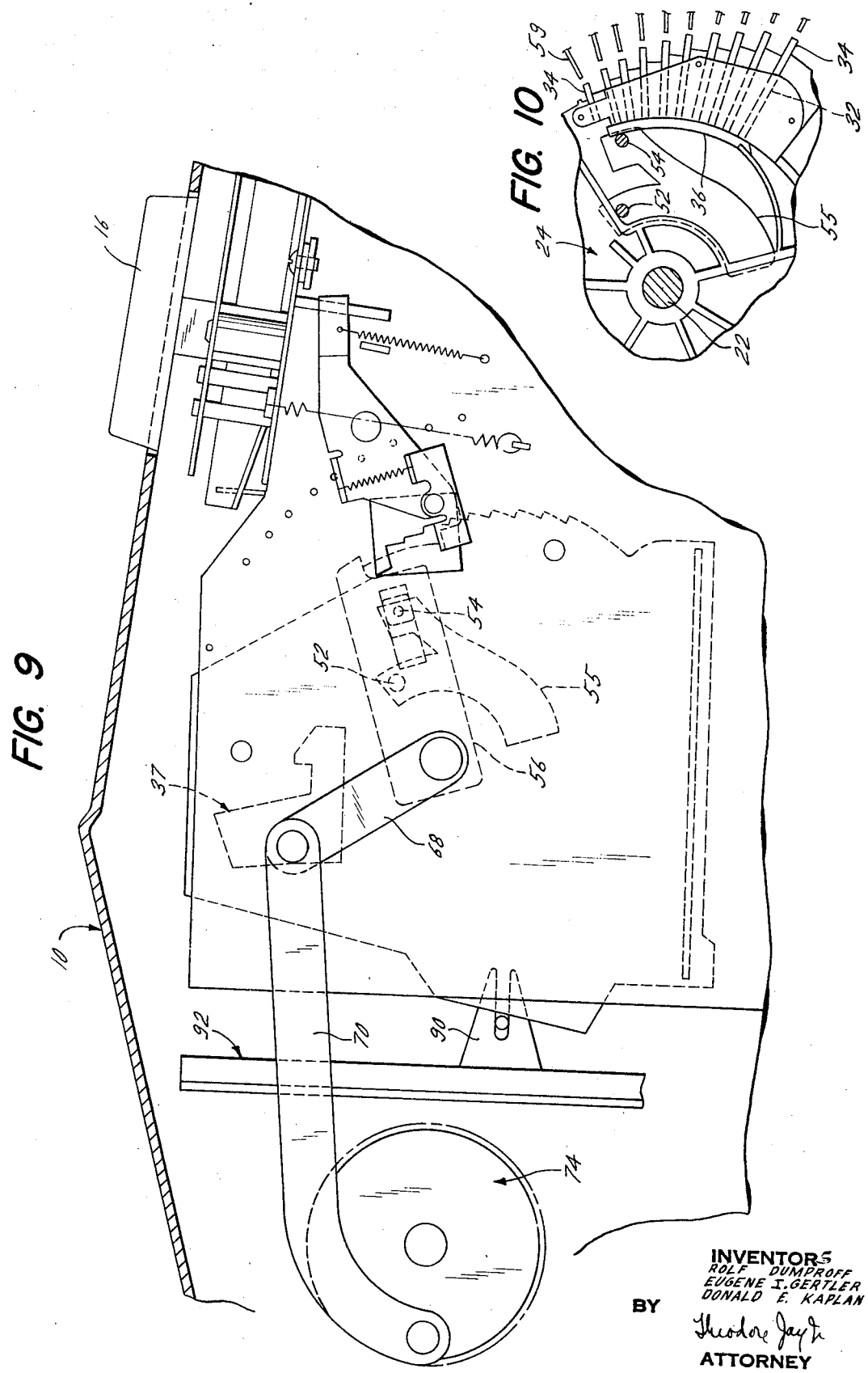

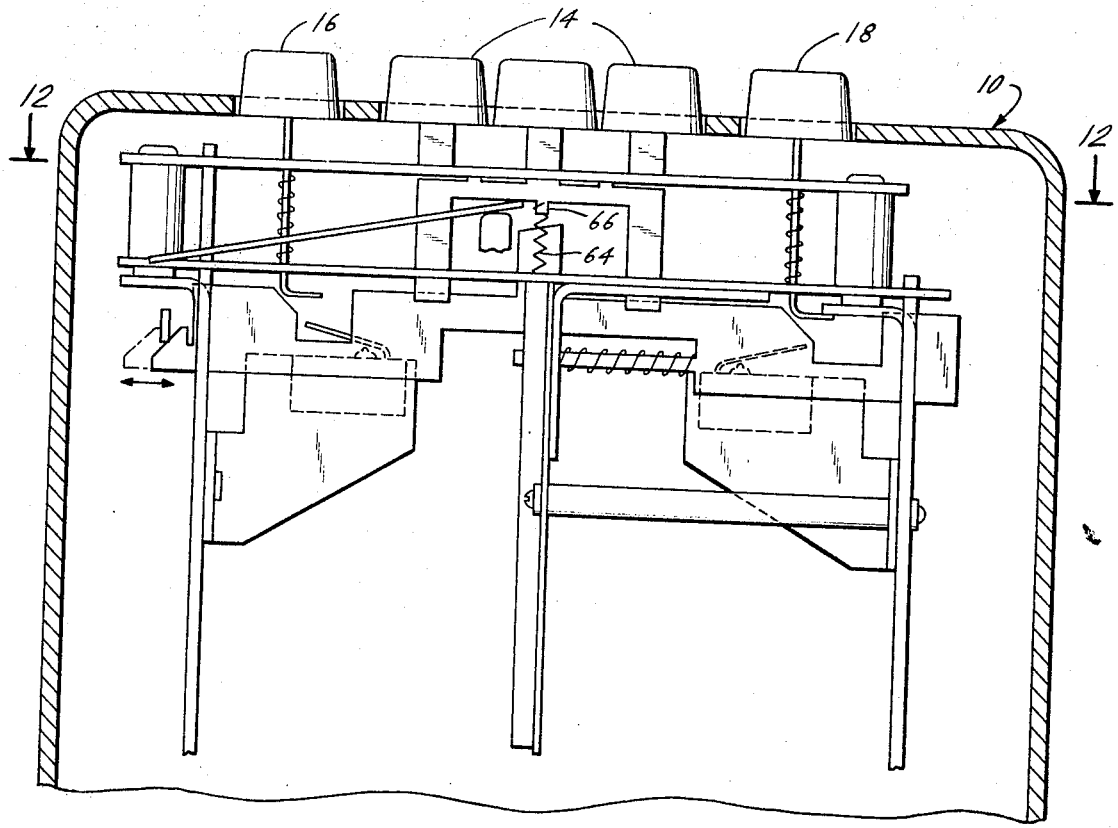
FIG. 11
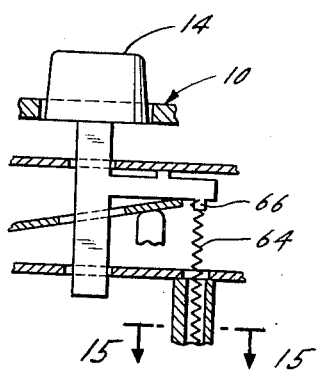
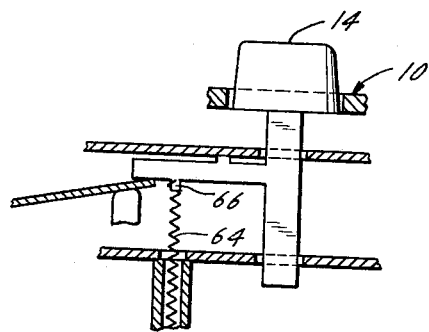
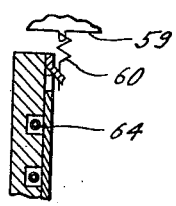

United States Patent Office 3,512,708
Patented May 19, 1970

3,512,708
DEVICE FOR STORING AND DISPLAYING DATA
Rolf Dumproff, Philadelphia, Pa., Eugene I. Gertler, Cinnaminson, N.J., and Donald E. Kaplan, Philadelphia, Pa., assignors to Ultronic Systems Corporation, a corporation of Delaware
Filed June 26, 1968, Ser. No. 740,297
Int. Cl. G06k 15/06
U.S. Cl. 235—58                                    8 Claims

ABSTRACT OF THE DISCLOSURE

Our device for storing and displaying data typically is used in systems for checking or verifying the properiety of extending credit to customers, wherein each customer is assigned a separate multiple digit account number. In our device, the number is entered therein through use of a keyboard, and the number so entered can be displayed for comparison with a credit card bearing the number and is also stored for read out and subsequent electronic processing as well as for printing. The device contains a plurality of individually rotatable discs or wheels, each carrying along its periphery at least one set of digits, for example, digits zero through nine inclusive, and the discs are selectively indexed by mechanisms inside the device in accordance with the entered number, whereby the number can be displayed and stored.

Summary of the invention

In our invention, a plurality of identical wheels or wheel-like discs lying in parallel spaced apart vertical planes are secured to a horizontal shaft. Each discs is separately rotatable about this shaft. Further, each disc has a peripheral region carrying at least one set of digits, typically digits zero through nine inclusive, arranged in spaced apart position along a column. The discs are normally held in a start position at which the same digits for all of said discs are arranged along a common row. In the start position, the first disc is offset with respect to the remaining discs whereby the digit for the first disc in the row is out of alignment with all other digits in the row.

Disc rotation means are responsive to successive actuations to cause each disc in turn to rotate to a position at which any selected one of its digits is displayed along the row.

Disc offset means are responsive to the rotation of any disc to offset the next successive disc prior to rotation thereof whereby only one disc is offset at any time.

Digit selection means are responsive to a plurality of successive digit entries, which together define a number for entry storage and display to produce one discrete actuation of the rotation means for each corresponding digit entry, and produce a corresponding rotation of the previously offset disc only. As a result, the previously offset disc rotates until the desired digit thereon appears in the row.

Typically, the structure recited above can be contained in a unit which can be placed on a desk or table and has a viewing slot in which only the selected row of digits is displayed. Initially no digits are displayed in this slot.

The digit selection means can be a keyboard having ten keys, each representing a different digit in the set. The operator wishing to use a credit card number of entry can enter each digit in the number separately, for example, starting with the most significant digit and proceeding in sequence to the least significant digit. In the start position, all discs are arranged so that the same digits are aligned in like rows with all digits on the first wheel being slightly offset from all corresponding digits of the other discs.

When a key is depressed for entry of the most significant digit, the first disc is rotated to a position at which this digit is now displayed by the first disc in the row and the second disc moves so that its digits are slightly offset both from the corresponding digits of the first disc and from the corresponding digits of all other discs. The key for the next highest significant digit is then pressed, the second digit then rotated to display the corresponding digit in the row, and the third disc is then moved to the offset position. This process is continued until the desired number is entered and displayed. This number is then stored and can be read out electrically or by other means. The keyboard can be cleared, whereby all discs, at the same time, are rotated and return to the start position.

Our invention, as a result of the use of the offset disc technique, eliminates any need to use movable carriages or similar mechanisms. Each entry of a digit produces a corresponding rotation of only one disc, i.e. the previously offset disc, and also causes the next successive disc to be offset. Thus mechanical movements are minmized and the number and complexity of parts are reduced.

Brief description of the drawings

In the drawings:

FIG. 1 is a perspective view of an embodiment of our invention;

FIG. 7 is a horizontal longitudinal section taken along line 7—7 in FIG. 3;

FIG. 8 is a vertical longitudinal section taken along line 8—8 in FIG. 7;

FIG. 9 is a view similar to FIG. 8 but showing the drive mechanism for "clearing";

FIG. 10 is a fragmentary section of a disc in position toward the end of the clear cycle;

FIG. 11 is a vertical transverse section taken along line 11—11 of FIG. 3;

FIG. 12 is a horizontal section taken along 12—12 of FIG. 11;

FIG. 13 is a fragmentary vertical section of the keyboard typical of certain keys;

FIG. 14 is a view similar to FIG. 13 but typical of other keys; and

FIG. 15 is a horizontal section along line 15—15 in FIG. 14.

Detailed description of preferred embodiment

Figure 2:
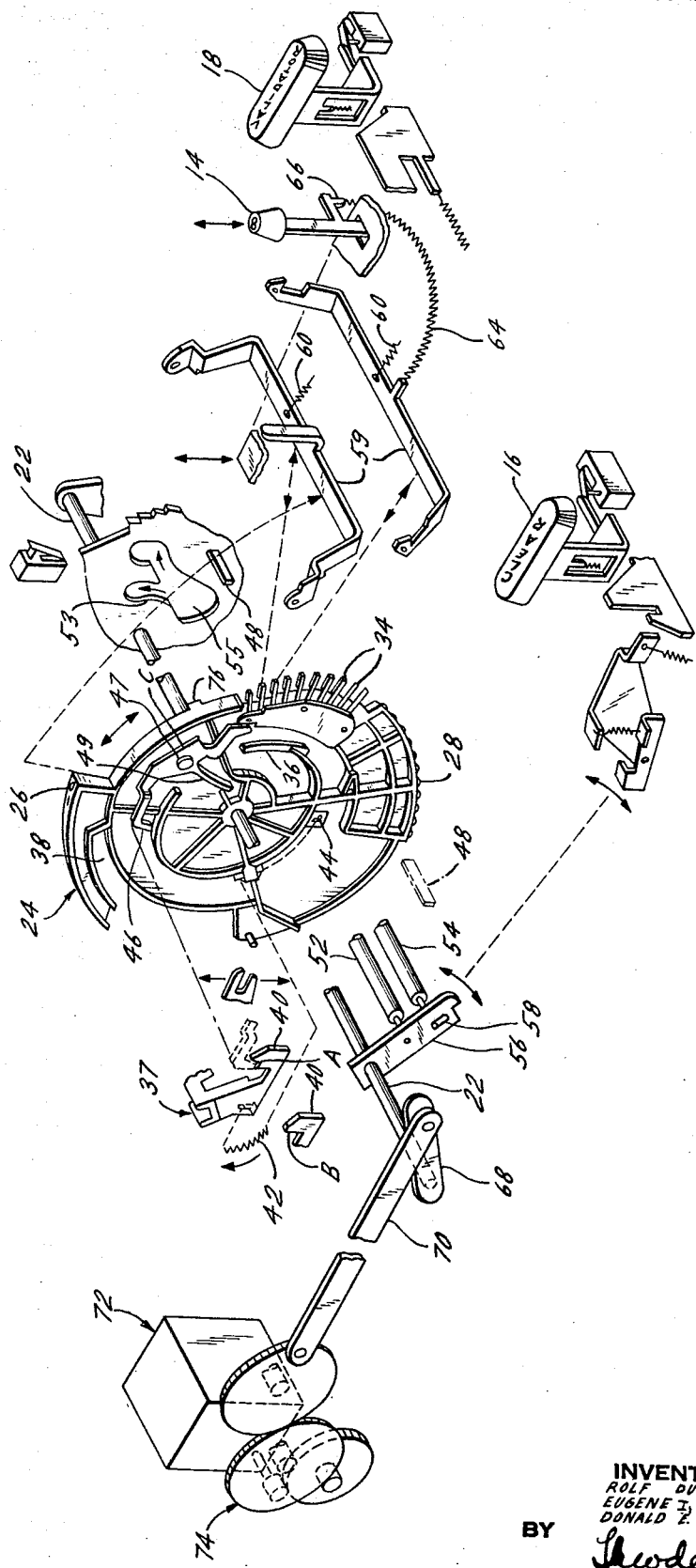
FIG. 2 is an exploded perspective of one validator disc and associated elements.
Figure 3:
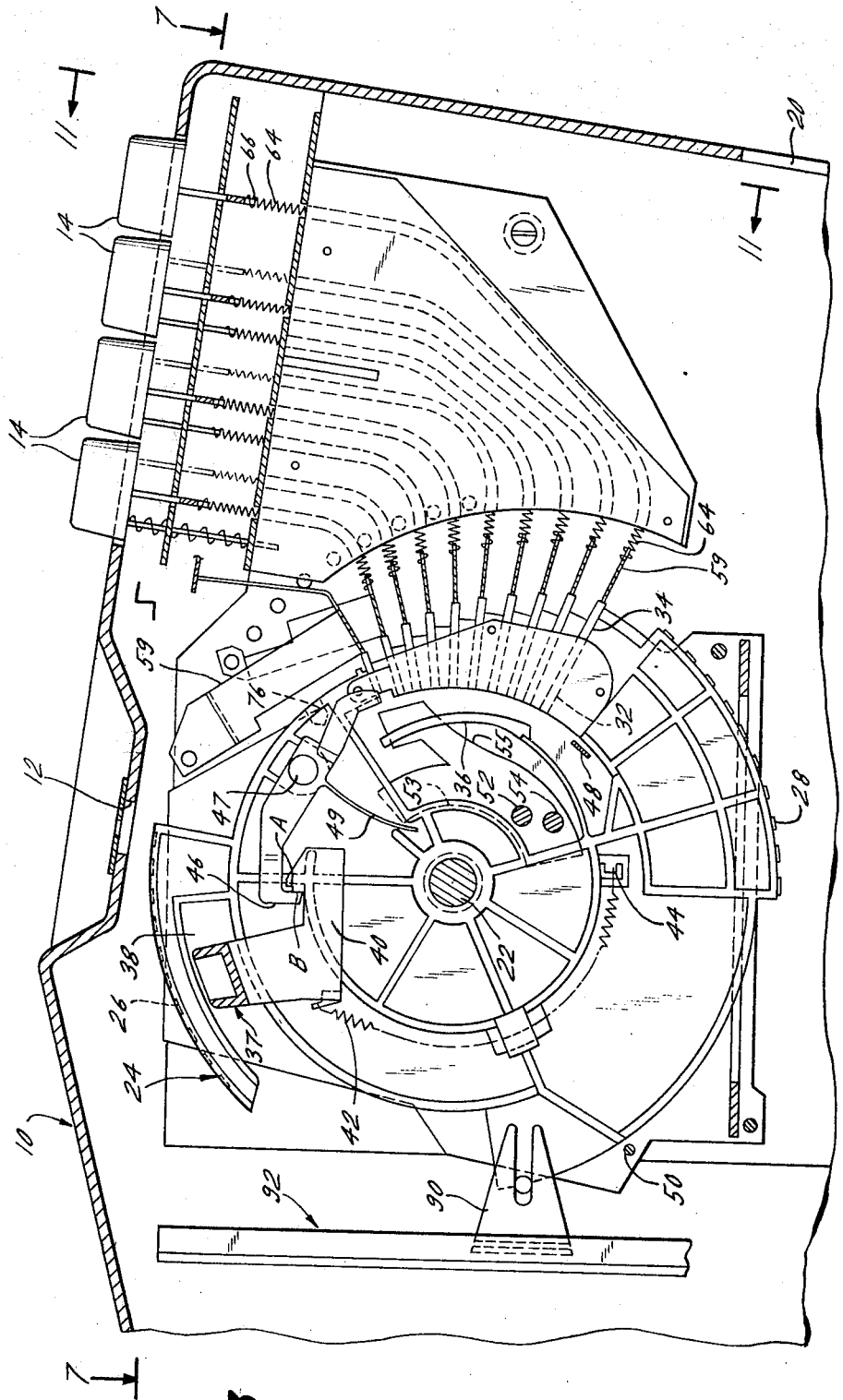
FIG. 3 is a vertical longitudinal section taken along line 3—3 of FIG. 1.
Figure 5:
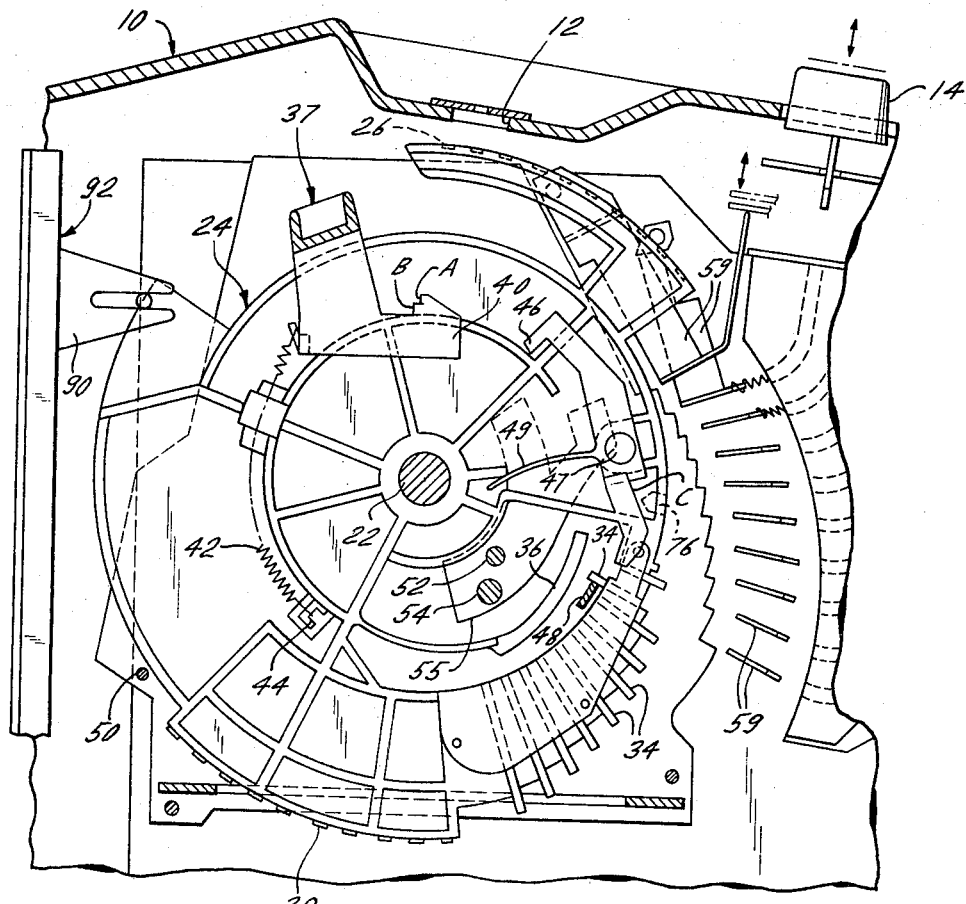
FIG. 5 is a fragmentary section similar to FIG. 3 as shown after the disc has been rotated to display a selected digit.
Figure 4:
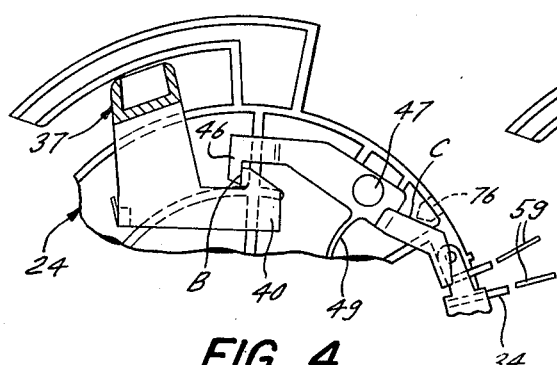
FIG. 4 is a fragmentary section of the first disc as shown in advanced or preset condition before entry of a number.
Figure 6:
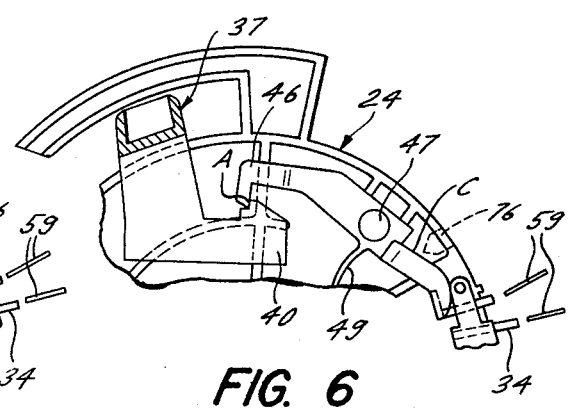
FIG. 6 is a fragmentary section of a disc adjacent to that of FIG. 5 and illustrating its preset advance as next in sequence for entry of a digit.

Referring now to FIGS. 1–12, our invention takes the form of a portable unit adapted to rest on a table top. The unit has an external housing 10 with a horizontal viewing aperture 12 in the top thereof disposed adjacent a keyboard having ten manually operated finger keys 14 for entry of digits, each key being identified with a different one of digits zero through nine inclusive. The keyboard also has two manually operated elongated keys, a "clear" key 16 and a "validate" key 18. The housing also has an opening 20 in a vertical surface in which papers can be inserted for printing and subsequent removal.

A horizontal shaft 22 extends transversely within the housing 10. One end of the shaft is secured to one end of linkage 68. The other end of linkage 68 is secured to one end of arm 70. Arm 70 is reciprocated back and forth under action of power unit 72 acting through gears 74, one of which is secured to the other end of arm 70. Twelve parellel wheel-like discs or wheels 24 lying in parallel vertical planes have central holes through which the shaft extends.

Each wheel 24 has a first peripheral section 26 containing separate digits zero through nine inclusive arranged in a column and a second and opposite section 28 containing the same set of digits in like arrangement. Section 26 digits are used for display and section 28 digits are used for printing.

Each wheel 24 also has a section 30 containing ten radial spaced slots 32 disposed in the plane of the wheel, with a separate radially elongated pin 34 disposed in each slot. These pins vary in length, each being associated with a separate digit within the set zero through nine, with the shortest length pin (known as the release pin) being associated with digit nine and the longest length pin being associated with digit zero. Each pin is slidable back and forth within its slot. Each wheel has an opening in which a curved flexible arm 36 is disposed. This arm has a first normal position at which it is spaced apart from the inner ends of all pins 34 and a second extended position (FIG. 10) at which it bears against these inner ends and forces all pins outward to their maximum radial extensions from the shaft.

A horizontal elongated frame 37 fixed in place spans the wheels, being parallel to the shaft. This frame extends through a curved opening 38 in each wheel. A plurality of vertical catches 40, each of which is associated with a corresponding wheel, are part of the frame and extend downward between the wheels. All catches 40 but that associated with the first wheel, are provided with surfaces A and B. The catch associated with the first wheel has only surface A separate main spring 42 is associated with each wheel and curves around a circular channel in the wheel, being secured at one end to the wheel itself at 44 and at the other end to the corresponding catch 40.

Each spring, if free to contract, will rotate its wheel about the shaft in the direction indicated by the enlarged arrowhead in FIG. 2. However, the corresponding catch 40 is normally engaged by acorresponding pawl 46 on each corresponding wheel to prevent rotation thereof. Each pawl is pivotable about point 47 by movement of its flexible arm 49.

Movement of the release pin 34, which is associated with the digit nine, inward disengages pawl 46 from catch 40 whereby the spring causes the wheel to rotate until a pin other than a release pin bears against a stop 48 or until a protrusion on the wheel strikes auxiliary stop 50. These stops are horizontal bars which span all wheels.

Two additional horizontal bars 52 and 54 extend transversely through slots in all wheels. One bar 52 extends transversely in fixed position between two end plates 56 which extend at right angles to shaft 22. The other bar 54 extends transversely between these plates but is movable back and forth in slots 58 in these plates.

When all catches and pawls are engaged, all wheels are so positioned that corresponding digits of all wheels other than the first wheel are aligned in corresponding rows with the digits on the first wheel being offset by a half digit length from the corresponding digits of all other wheels. This offset is obtained since the pawl associated with the first wheel engages surface B while all other pawls engage corresponding surfaces A.

Each wheel has a protrusion 76 which rides over surface C of the pawl of the next wheel. When the pawl of any wheel is unlatched from its catch and this wheel rotates, its protrusion 76 rides over surface C of the pawl of the adjacent wheel and causes it to pivot slightly to move from surface A of its catch to surface B, thus causing the adjacent wheel to rotate through a distance of one half a digit, thus causing the digits in this next wheel to be offset.

The keyboard portion of the structure is used to control the movement of ten spaced apart horizontal cross bars or members 59 which span all wheels.

Each member has a normally withdrawn position at which it is spaced apart from the pins of all wheels and has an advanced position at which it will move into contact with an radially push a corresponding one of the pins of the wheel which has been previously placed in the offset position. The geometry is such that each member passes between the pins of all wheels which are not in the offset position. By virtue of this arrangement only one wheel can be rotated, for digit entry, at one time. The use of pins of varying length, with the inner ends located along a uniform interior radius and the outer ends located along a monotonically varying outer radius, as shown, permits an operator to initiate entry of a digit while the disc rotation produced by the previous entry is still continuing.

Each member is normally spring biased into the withdrawn position by a separate return spring 60 and is also connected via flexible shaft 64 to a corresponding key stem 66. The key 14 associated with the digit nine operates only one key stem and when pressed down moves one member 59 into contact with the release pin of the offset wheel. All other keys 14 operate key stem 64 of the member associated with the release pin and in addition operate the key stem of the member associated with another pin; for example if the key bearing the digit four is depressed, the member associated with the release pins and the member associated with the fours pins are moved into corresponding contact with the nine and four pin of the offset wheel. When the key is released, the members controlled by it are returned by springs 60 to the withdrawn position.

When only the release pin of a wheel is contacted by a member 59, this wheel rotates until the protrusion on the wheel strikes auxilary stop 50. If the release pin and any other pin are contacted by different members at the same time, the wheel rotates until this other pin strikes stop 48.

In other words, depression of the release pin alone produces maximum rotation of the wheel. Depression of the release pin and another produces a variable rotation, the length of which is determined by the other pin, which is always less than maximum.

In the starting or cleared position, the wheels are all so positioned that aperture 12 is blank. An operator wishing to enter an account number into the unit first presses the one of keys 14 which carries the most significant digit of the number. For example, if the key bearing number four is depressed, the two members associated with the nines digits and the fours digits are moved into contact with the release and four pins of the first wheel, pushing these pins radially inward. This action disengages the pawl of the first wheel fram its catch and the first wheel rotates to a position at which its digit four in section 26 appears in aperture 12. At the same time, the pawl of the second wheel is moved from surface A to surface B whereby the digits of the second wheel are offset. Since the first wheel was offset, the members contacting its pins pass between the pins of all other wheels and do not depress them.

The operator then presses the key which carries the next digit of the number, causing the second wheel to rotate and display the appropriate digit in the aperture. At this point, the same number appears on a selected row of the sections 28 whereby this row (which is accessible through opening 20) can be used for printing by conventional techniques.

Each wheel has a finger 90 which, when the wheel has rotated to the desired position, can be used to move a wiper on a slide switch to enter the digit into an electrically sensible register 92. When the complete number has been so entered, the operator can depress "validate" key 18 to initiate the process of transferring the number out of the register for further processing.

When the operator depressed the "clear key," the keyboard is locked to prevent damage; a microswitch is closed, energizing the motor; the motor rotates the shaft until bar 52 is rotated through a circular arc bearing against surface 53 of slot 55 and returning all wheels to positions at which their pawls engage their catches, i.e. the wheels are returned to their start position. At the same time, bar 54 swings outward against all arms 36 and pushes these arms outward against all pins to force all pins outward to their maximum radial extensions from the shaft.

At the end of the cycle, the keyboard is unlocked, and the entire process can be repeated as desired.

While we have described our invention with particular reference to preferred embodiments, many variations and modifications within the scope and sphere of our invention, as defined in the claims which follow, will be apparent to those skilled in the art.

What is claimed is:

1. A device for the storage and display of data comprising:

a horizontal shaft;

a plurality of identical wheel-like discs lying in parallel spaced apart vertical planes and secured to said shaft, each disc being separately rotatable about said shaft, each disc having a peripheral region carrying a set of digits arranged in spaced apart position along a column, said discs being normally held in a start position at which the same digits for all of said discs are arranged along a row, the first disc being offset with respect to the remaining discs whereby the digits in said row for the first disc is out of alignment with the remaining digits in said row;

disc rotation means responsive to successive discrete actuations to cause each disc in turn to rotate to a position at which any selected one of its digits is displayed along said row;

disc offset means responsive to the rotation of any disc to offset the next disc prior to rotation of said next disc, whereby only one disc in said unit is offset at any time; and digit selection means responsive to a plurality of successive digit entries which together define a number for entry into said unit, said selection means producing one discrete actuation of said rotation means for each corresponding digit entry to produce a corresponding rotation of the previously offset disc only, thus enabling the previously offset disc to display said digit entry in said row.

2. A unit as set forth in claim 1 wherein said selection means includes a plurality of spaced apart horizontal members, each member having a rest position at which it is spaced apart from said discs and an actuated position at which it is moved into peripheral engagement with all of said discs; and said rotation means includes a separate rotation mechanism for each disc, each mechanism having a plurality of radially separated elements, each mechanism responding to actuation by at least one of said members and said elements having a relationship at which a horizontal member in actuated position can only engage an element associated with an offset discs and cannot engage an element associated with any other disc.

3. A unit as set forth in claim 2 wherein each discs is provided with a plurality of spaced apart radial slots equal in number to said digits, each slot being associated with a corresponding digit and adapted to receive a corresponding one of said elements, each element being slidable back and forth in its slot, each element being normally extended fully outward from the disc and being pushed inward only when engaged by a horizontal member.

4. A unit as set forth in claim 3 wherein each rotation mechanisms has a latch which normally prevents disc rotation, said latch being released when a selected one of the corresponding elements is pushed inward either above or together with other corresponding elements whereby the disc rotates to a position determined by either a stop or the other corresponding pushed element.

5. A unit as set forth in claim 4 wherein each disc has an opening adjacent said slots, said unit further including a stop extending horizontally through the openings of all of said discs, said elements, when fully extended, being spaced apart from said stop, any elements, when pushed inward, contacting said stop during disc rotation to stop the rotation at the desired position.

6. A unit as set forth in claim 5 further including a mechanical assembly extending through said openings in said disc, said assembly, when actuated, returning all disc displaying said number back to the start position to remove the number entry and also returns all elements to fully extended positions.

7. A unit as set forth in claim 6 wherein said set includes digits from zero to nine inclusive, the elements for each disc varying in length in discrete increments, the largest length element being associated with digit zero, the shortest length element being associated with digit nine.

8. A unit as set forth in claim 7 wherein each discs has another spaced apart peripheral region carrying a second and like set of digits which are used for printing, whereby the same number entered into the unit for display can also be printed out.

References Cited

UNITED STATES PATENTS

| | | | |
|---|---|---|---|
| 1,990,350 | 2/1935 | Schump | 235—60 |
| 2,667,307 | 1/1954 | Westinger et al. | 235—60 |
| 3,063,763 | 5/1962 | Chall | 235—61 |
| 3,136,482 | 6/1964 | Oldenburg et al. | 235—60 |

RICHARD B. WILKINSON, Primary Examiner

S. A. WAL, Assistant Examiner

U.S. Cl. X.R.

235—60